United States Patent
Omori (10) Patent No.: US 6,734,994 B2
(45) Date of Patent: *May 11, 2004

(54) IMAGE READING METHOD AND APPARATUS

(75) Inventor: Akira Omori, Sagamihara (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

(21) Appl. No.: 09/177,604

(22) Filed: Oct. 23, 1998

(65) Prior Publication Data

US 2002/0027668 A1 Mar. 7, 2002

(30) Foreign Application Priority Data

Oct. 27, 1997 (JP) .............................................. 9-294664

(51) Int. Cl.[7] ................................................. H04N 1/04
(52) U.S. Cl. ........................ 358/474; 358/1.13; 358/1.2
(58) Field of Search ................................ 358/1.13, 1.15, 358/1.18, 1.14, 474, 1.2, 500, 1.16, 404, 440; 709/249, 229, 222

(56) References Cited

U.S. PATENT DOCUMENTS 5,859,956 A * 1/1999 Sugiyama et al. .......... 395/112

* cited by examiner

*Primary Examiner*—Kimberly Williams
*Assistant Examiner*—Negussie Worku
(74) *Attorney, Agent, or Firm*—Fitzpatrick, Cella, Harper & Scinto (57) ABSTRACT

A plurality of output destinations such as a mail server and a printer are connected via a network, and image formats or resolutions are set as image scanning parameters for each output destination. A parameter that is common to each of the output destinations is selected from the set parameters, an image is read in accordance with the parameter selected and the read image data is output to each of the output destinations via the network.

9 Claims, 5 Drawing Sheets

IMAGE READING METHOD AND APPARATUS

BACKGROUND OF THE INVENTION

This invention relates to an image reading method and apparatus for outputting read image data to a plurality of output destinations.

Scanners now in practical use allow the setting of various parameters such as image reading resolution and image format and read image data in accordance with these parameters. In a situation where a scanner of this kind reads an image and outputs the read image to a plurality of output destinations such as printers and mail servers simultaneously, the scanner performs scanning in accordance with specific parameters decided freely in advance and executes processing to convert the read image to image data whose parameters can be handled by each output destination, the conversion processing being executed at output of the image to each output destination. The scanner then outputs the image data resulting from the conversion.

In this example of the prior art, however, the processing for parameter conversion must be executed for each and every output destination in a case where the image scanning parameters that can be handled at a plurality of output destinations differ for each destination and in a case where a specific parameter decided freely in advance at the time of scanning differ from the parameters of the plurality of output destinations. Consequently, the processing time needed for conversion is greater than that required when the image data having a parameter that can be handled by the output destination is created at the time of the scanning operation. In case of digital processing such as conversion of resolution, moreover, there are instances in the prior art where processing that leads to image degradation must be executed.

SUMMARY OF THE INVENTION

Accordingly, an object of the present invention is to provide an image reading method and apparatus in which the reading of an image is performed using a parameter common to a plurality of output destinations, overall processing efficiency is improved and image degradation is suppressed.

Another object of the present invention is to provide an image reading method and apparatus in which an image format that is the same for a plurality of output destinations connected via a network is selected automatically and an image is read in accordance with the format selected, thereby improving processing speed and efficiency.

A further object of the present invention is to provide an image reading method and apparatus in which a resolution that is the same for a plurality of output destinations connected via a network is selected automatically and an image is read in accordance with the resolution selected, thereby eliminating the need for digital processing, such as resolution conversion, that is accompanied by degradation of the image, the end result being less degradation of the image.

According to the present invention, the foregoing objects are attained by providing an image reading apparatus for outputting read image data to a plurality of output destinations, comprising selection means for selecting a common parameter of the output destinations from image scanning parameters that have been set for each of the plurality of output destinations; reading means for reading an image in accordance with the parameter selected by the selection means; and output means for outputting, to each of the output destinations, image data read by the reading means.

In a preferred embodiment, the image scanning parameters are image formats.

In a preferred embodiment, the image scanning parameters are resolutions.

In a preferred embodiment, the output means outputs read image data to a plurality of output destinations connected via a network.

According to the present invention, the foregoing objects are attained by providing an image reading method for outputting read image data to a plurality of output destinations, comprising a selection step of selecting a common parameter of the output destinations from image scanning parameters that have been set for each of the plurality of output destinations; a reading step of reading an image in accordance with the parameter selected by the selection step; and an output step of outputting, to each of the output destinations, image data read by the reading step.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments according to the present invention will now be described with reference to the drawings.

First Embodiment

Figure 1:
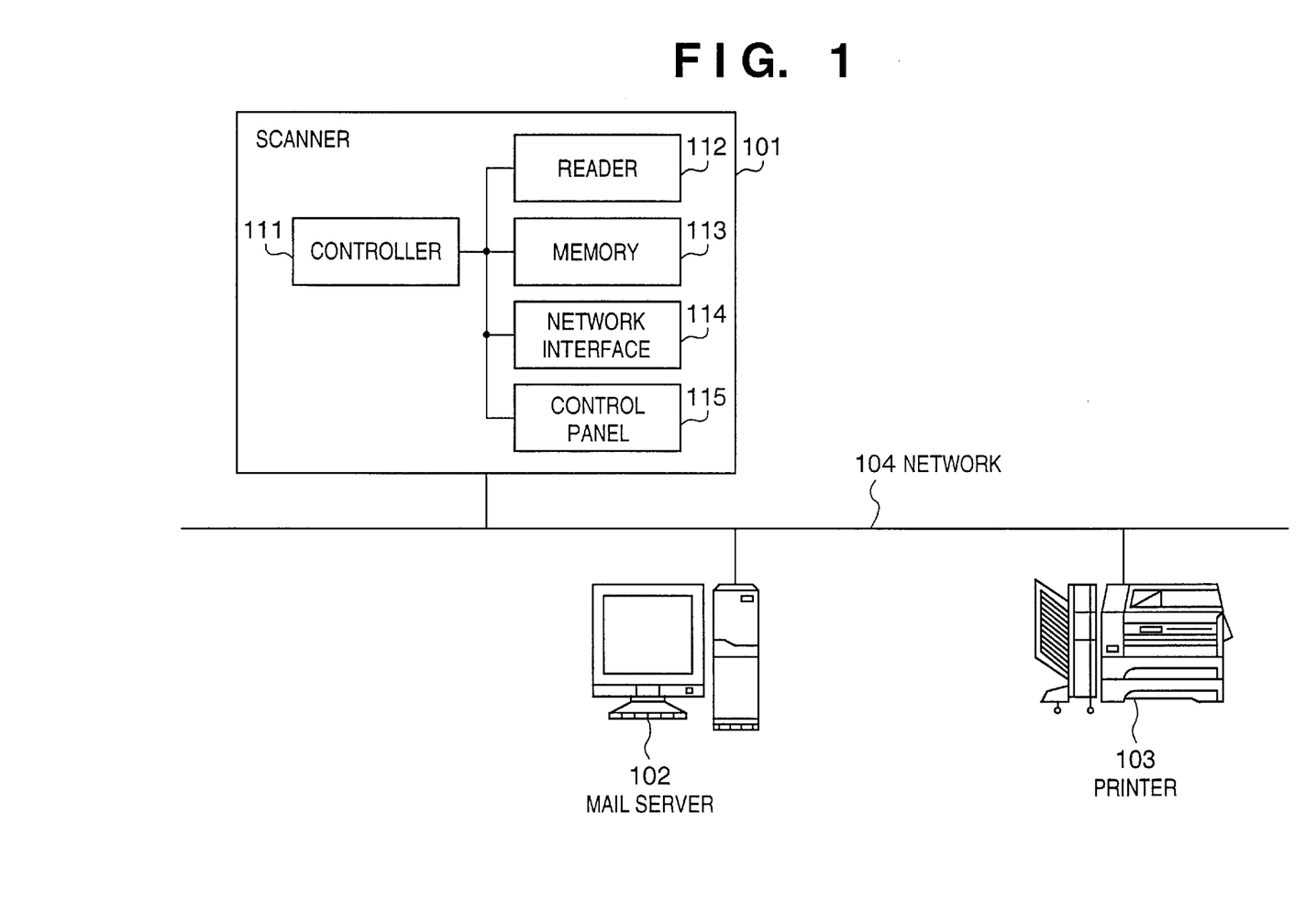
FIG. 1 is a block diagram illustrating the configuration of a system according to embodiments of the present invention.

FIG. 1 is a block diagram illustrating the configuration of a system according to embodiments of the present invention. As shown in FIG. 1, the system includes a scanner 101 provided internally with a controller 111, a reader 112, a memory 113, a network interface 114 and a control panel 115; a mail server 102; a printer 103 that operates in accordance with an electrophotographic method or ink-jet printing method, etc.; and a network 104, namely a local area network such as the Ethernet.

The controller 111 includes a CPU for controlling the overall scanner 101, a ROM storing programs executed by the CPU, and a RAM that has a working area used when the CPU executes processing, variable tables, etc.

In the system described above, the control panel 115 of the scanner 101 inputs various parameters (image data parameters) such as resolution and image format capable of being handled by the mail server 102 and printer 103, which are the output destinations, to the controller 111. In response, the CPU of the controller 111 retains these image data parameters as lists in the memory 113.

Figure 2A:
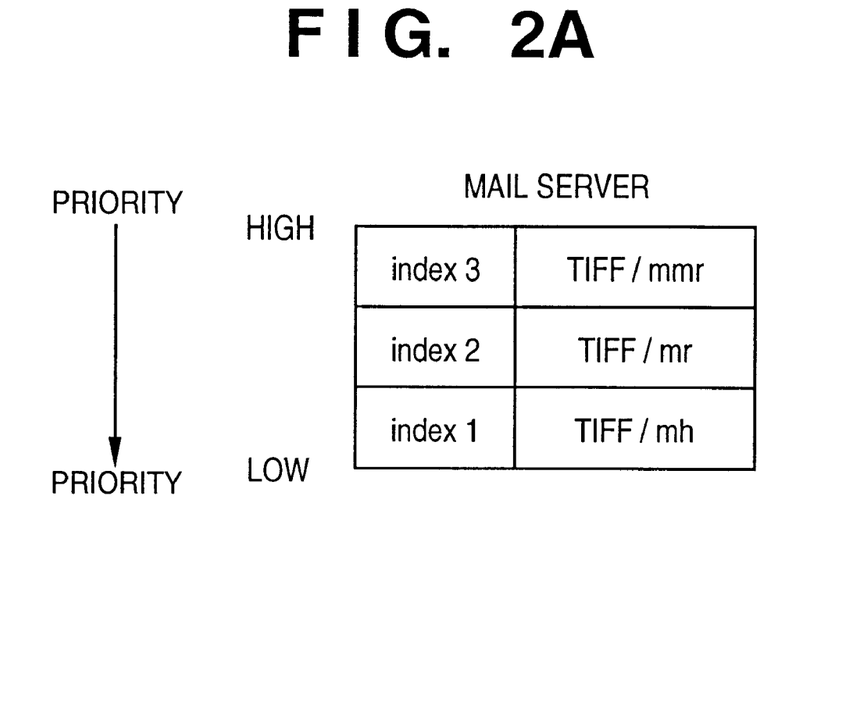
FIGS. 2A and 2B are diagrams showing image data parameter lists according to a first embodiment.
Figure 2B:
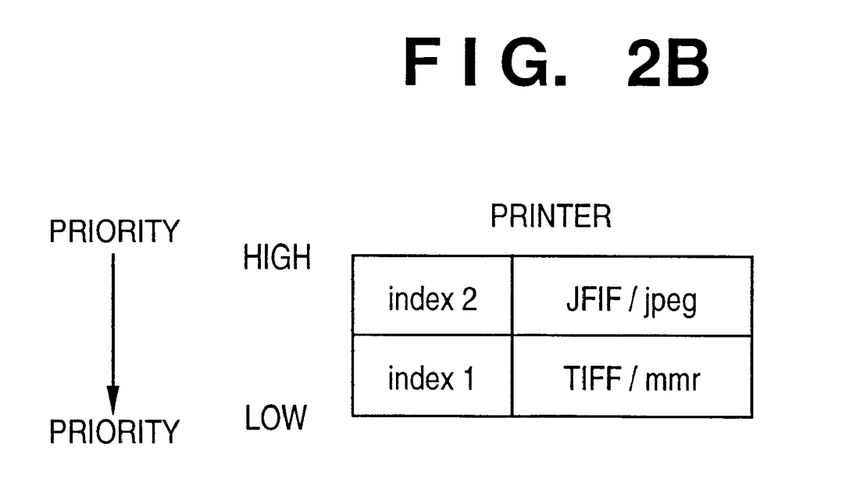

FIGS. 2A and 2B show image data parameter lists according to the first embodiment. Specifically, FIG. 2A is a list of image formats capable of being handled by the mail server 102, and FIG. 2B is a list of image formats capable of being handled by the printer 103. Each list is such that the image formats are arranged in order of decreasing priority in terms of the efficiency with which they can be implemented by the output destination. Each image format is indicated by an index number. That is, in a case where the output destination is the mail server 102, image formats TIFF/mmr at index number 3, TIFF/mr at index number 2 and TIFF/mh at index number 1 can be implemented efficiently in the order mentioned.

In this embodiment, it is assumed that at least one type of image data parameter capable of being handled by both the mail server 102 and printer 103 is provided, though the processing efficiency with this parameter is not high as far as the mail server 102 and printer 103 are concerned. In the example of FIGS. 2A and 2B, the image format capable of being handled by both the mail server 102 and printer 103 is at index number 3 in the mail server 102 and at index number 1 in the printer 103.

Next, the control panel 115 of the scanner 101 enters a command to read an image and output the image data to the mail server 102 and printer 103. In response, the CPU of the controller 111 selects one image data parameter from the image data parameter list, sets the parameter in the reader 112 and commands the reader to read the image in accordance with this parameter. When reading of the image data by the reader 112 is finished, the read image data is transmitted to each output destination via the network interface 114.

Figure 3:
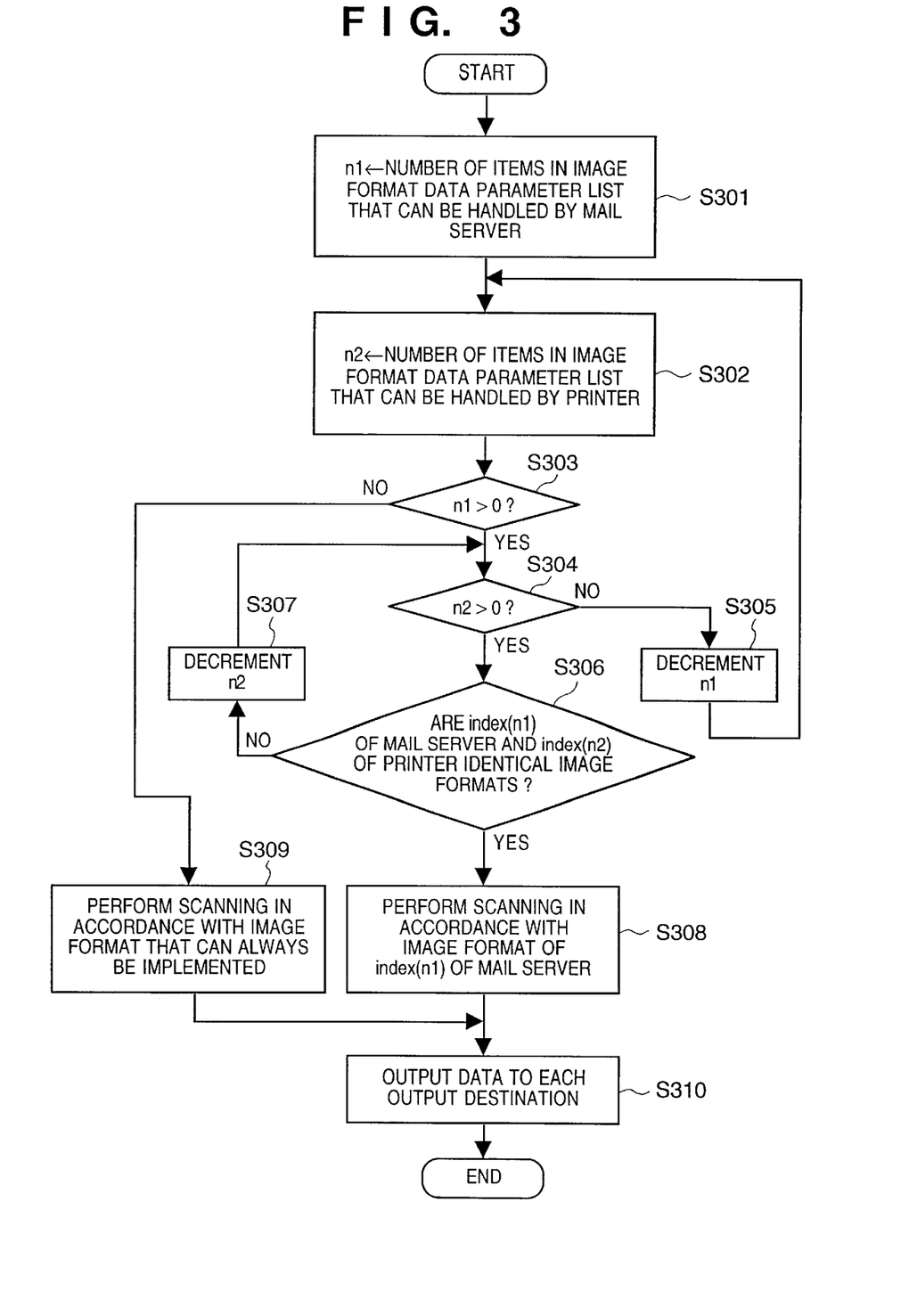
FIG. 3 is a flowchart illustrating processing for selecting image data parameters according to the first embodiment.

FIG. 3 is a flowchart illustrating processing for selecting image data parameters according to the first embodiment. According to the first embodiment, the common image format (TIFF/mmr) is selected as the image data parameter from the image formats shown in FIG. 2A and the image is read in accordance with this image format.

First, at step S301 in FIG. 3, the number of items in the image format data parameter list that are capable of being handled by the mail server (output destination) 102 is substituted into a variable n1, then, at step S302, the number of items in the image format data parameter list that are capable of being handled by the printer (output destination) 103 is substituted into a variable n2. Next, it is determined at step S303 whether the variable n1 is greater than zero. If the answer is "YES", then control proceeds to step S304, where it is determined whether the variable n2 is greater than zero. If n1 is zero ("NO" at step S304), then control proceeds to step S305, where n1 is decremented, after which control returns to step S302.

If it is found at step S304 that n2 is greater than zero, control proceeds to step S306, at which it is determined whether an image format data parameter for which the variable n1 of the image format data variable list of mail server 102 is referred to as the index and an image format data parameter for which the variable n2 of the image format data variable list of printer 103 is referred to as the index are the same type of image format data parameter. In other words, this processing retrieves the highest-priority image formats that match in the image format data parameter list of mail server 102 and image format data parameter list of printer 103.

If image format data parameters match, then control proceeds to step S308, at which this image format data parameter is set in the reader 112 and the reader is instructed to read the image in accordance with this parameter. If a match of image format data parameter is not achieved at step S306, then control proceeds to step S307, at which the variable n2 is decremented, whereupon control returns to step S304.

If the variable n1 is found to be zero ("NO" at step S303), then control proceeds to step S309. Here an image format data parameter that can always be handled by each of the output destinations without fail is set in the reader 112 and the reader is instructed to read the image in accordance with this parameter. This is followed by step S310, at which the read data is output to each of the output destinations via the network interface 114.

Thus, in accordance with the first embodiment, when read image data is output to the mail server 102 and printer 103, an image format that is common to each of these output destinations is selected as the image format data parameter and reading of the image is carried out in accordance with the image format selected. This makes it possible to raise the processing speed and improve the efficiency of the scanner 101.

Second Embodiment

A second embodiment according to the present invention will now be described in detail with reference to the drawings.

The first embodiment deals with a case where image format is used as the image data parameter. In the second embodiment, however, image resolution is employed as the parameter. The system configuration is the same as that of the first embodiment and need not be described again.

Figure 4A:
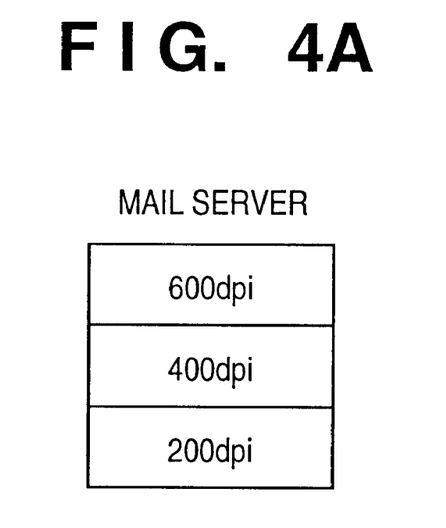
FIGS. 4A and 4B are diagrams showing image data parameter lists according to a second embodiment.
Figure 4B:
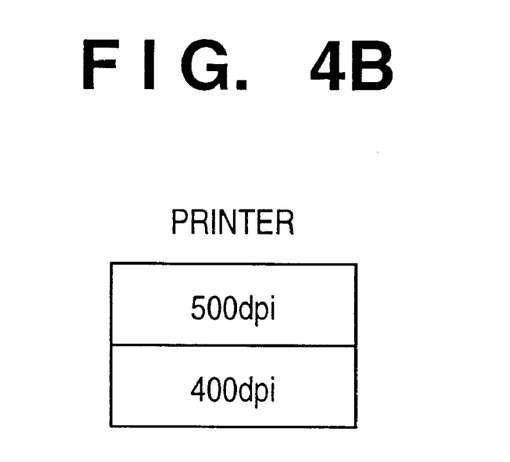

FIGS. 4A and 4B shows image data parameter lists according to the second embodiment, FIG. 4A is a list of resolutions capable of being implemented by the mail server 102 and FIG. B is a list of resolutions capable of being implemented by the printer 103.

Figure 5:
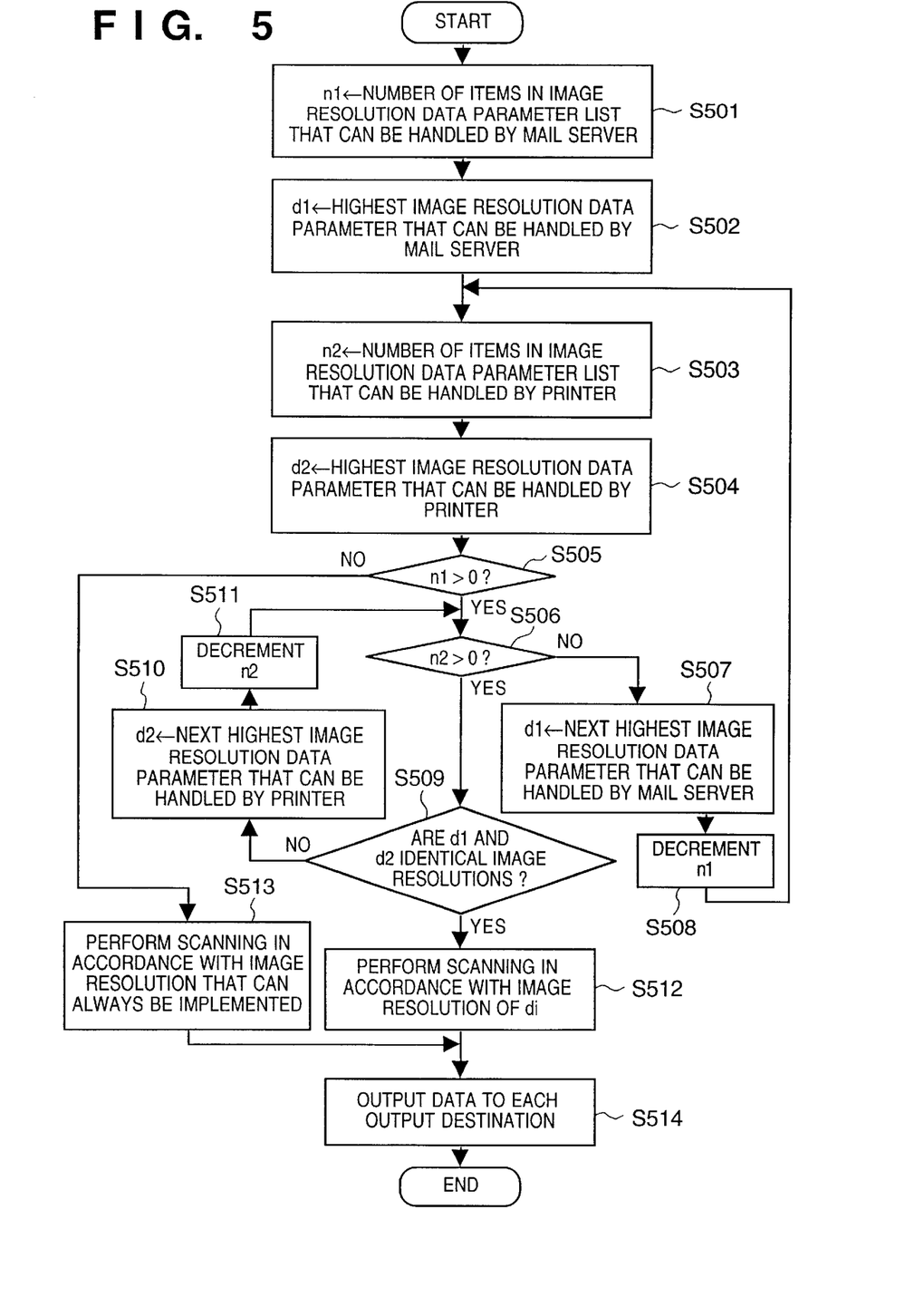
FIG. 5 is a flowchart illustrating processing for selecting image data parameters according to the second embodiment.

FIG. 5 is a flowchart illustrating processing for selecting image data parameters according to the second embodiment. The image data parameters are retained in memory 113 as the lists shown in FIGS. 4A and 4B. According to the second embodiment, a resolution (400 dpi) capable of being implemented by both output destinations (mail server 102 and printer 103) is selected by this selection processing and the resolution selected is set as the reading resolution.

The number of items in the image resolution data parameter list capable of being handled by the mail server 102 is substituted into a variable n1 at step S501 and the highest image resolution data parameter capable of being handled by the mail server 102 is substituted into a variable d1 at step S502. Next, the number of items in the image resolution data parameter list capable of being handled by the printer 103 is substituted into a variable n2 at step S503 and the highest image resolution data parameter capable of being handled by the printer 103 is substituted into a variable d2 at step S504.

Next, it is determined at step S505 whether the variable n1 is greater than zero. If the answer is "YES", then control proceeds to step S506, where it is determined whether the variable n2 is greater than zero. If n2 is found to be zero ("NO" at step S506), then control proceeds to step S507, where the next highest image resolution data parameter capable of being implemented by the mail server 102 is substituted into the variable d1. The variable n1 is then decremented at step S508, after which control returns to step S503.

If it is found at step S506 that the variable n2 is greater than zero, control proceeds to step S509, at which it is determined whether the variables d1 and d2 are indicative of identical image resolution data parameters. In other words, this processing retrieves the highest resolutions that match in the image resolution data parameter list of mail server 102 and image resolution data parameter list of printer 103.

If the image resolution data parameters differ, control proceeds to step S510, at which the next highest image resolution data parameter capable of being implemented by the printer 103 is substituted into the variable d2. The variable n2 is then decremented at step S511 and control returns to step S506. If image resolution data parameters are found to match ("YES" at step S509), then control proceeds to step S512, at which this image resolution data parameter is set in the reader 112 and the reader is instructed to read the image in accordance with this parameter.

If the variable n1 is found to be zero ("NO" at step S505), then control proceeds to step S313. Here an image resolution data parameter that can always be executed by each of the output destinations without fail is set in the reader 112 and the reader is instructed to read the image in accordance with this parameter. This is followed by step S514, at which the read data is output to each of the output destinations via the network interface 114.

Thus, in accordance with the second embodiment, when read image data is output to the mail server 102 and printer 103, a resolution that is common to each of these output destinations is selected as the image data parameter and reading of the image is carried out in accordance with the resolution selected. This makes it unnecessary for the scanner 101 to execute digital processing such as a resolution conversion that reduces image quality, thereby making it possible to suppress image degradation.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiments.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, as described above, in accordance with the embodiments of the present invention, the reading of an image is performed using a parameter common to a plurality of output destinations, overall processing efficiency can be improved and image degradation suppressed.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus for outputting read image data to a plurality of output destinations, comprising:

memory means for storing, for each of said plurality of output destinations, image reading parameters used for reading of image data;

determination means for determining the presence of one or more common parameters, being suitable for each of said plurality of output destinations, from among the image reading parameters stored by said memory means;

selection means for automatically selecting one of said common parameters from among the one or more common parameters determined by said determination means;

reading means for reading an image in accordance with the common parameter automatically selected by said selection means and for generating image data representing the image; and output means for outputting, to each of said plurality of output destinations, the image data generated by said reading means based on the automatically selected common parameter.

2. The apparatus according to claim 1, wherein the plurality of image reading parameters are image formats.

3. The apparatus according to claim 1, wherein the plurality of image reading parameters are resolutions.

4. The apparatus according to claim 1, wherein said output means outputs read image data to the output destinations via a network.

5. An image reading method for outputting read image data to a plurality of output destinations, comprising:

a memory step, for storing for each of said plurality of output destinations, image reading parameters used for reading of image data;

a determination step, of determining the presence of one or more common parameters, being suitable for each of said plurality of output destinations, from among the image reading parameters stored in said memory step;

a selection step, of automatically selecting one of said common parameters from among the one or more common parameters in accordance with the determination made in said determination step;

a reading step, of reading an image in accordance with the common parameter automatically selected in said selection step and generating image data representing the image; and an output step, of outputting, to each of said plurality of output destinations, the image data generated in said reading step based on the automatically selected common parameter.

6. The method according to claim 5, wherein the plurality of image reading parameters are image formats.

7. The method according to claim 5, wherein the plurality of image reading parameters are resolutions.

8. The method according to claim 5, wherein said output step includes outputting read image data to the plurality of output destinations via a network.

9. A computer readable storage medium storing program code of a program for image reading processing, comprising:

a code of a memory step, of storing for each of said plurality of output destinations, image reading parameters used for reading of image data;

a code of a determination step, of determining the presence of one or more common parameters, being suitable for each of said plurality of output destinations, from among the image reading parameters stored in said memory step;

a code of a selection step, of automatically selecting one of said common parameters from among the one or more common parameters in accordance with the determination;

a code of a reading step, of reading an image in accordance with the common parameter automatically selected, and of generating image data representing the image; and a code of an output step, of outputting, to each of said plurality of output destinations, the image data generated, based on the automatically selected common parameter.

* * * * *

UNITED STATES PATENT AND TRADEMARK OFFICE
CERTIFICATE OF CORRECTION

PATENT NO. : 6,734,994 B2
DATED : May 11, 2004
INVENTOR(S) : Akira Omori

It is certified that error appears in the above-identified patent and that said Letters Patent is hereby corrected as shown below:

Title page,
Item [56], References Cited, U.S. PATENT DOCUMENTS,
Insert -- 6,177,934    1/2000  Sugiura .... 345/335.

Column 1,
Line 29, "differ" should read -- differs --.

Column 4,
Line 32, "show" should read -- shows --; and
Line 35, "B" should read -- 4B --.

Signed and Sealed this

Seventh Day of September, 2004

JON W. DUDAS
*Director of the United States Patent and Trademark Office*